United States Patent [19]

Herubel

[11] 4,350,624

[45] Sep. 21, 1982

[54] METHOD FOR RECOVERING MEAT PROTEINS REMAINING ATTACHED TO THE BONES AFTER THE BONING OPERATION

[75] Inventor: Jean-Frederic Herubel, Guebwiller, France

[73] Assignee: N. Schlumberger & Cie, Guebwiller, France

[21] Appl. No.: 110,792

[22] Filed: Jan. 9, 1980

[30] Foreign Application Priority Data

Jan. 11, 1979 [FR] France .................................. 79 00638

[51] Int. Cl.$^3$ .............................................. A23J 1/02
[52] U.S. Cl. ................................ 260/112 R; 426/657; 426/437; 426/480
[58] Field of Search ....................... 426/657, 437, 480; 260/112 R

[56] References Cited

U.S. PATENT DOCUMENTS

| | | | |
|---|---|---|---|
| 1,138,348 | 5/1915 | Bohon | 426/657 X |
| 2,450,810 | 10/1948 | Opper et al. | 260/112 R |
| 2,684,960 | 7/1954 | Taylor | 260/112 R |
| 3,062,655 | 11/1962 | Staackmann et al. | 426/437 X |
| 3,491,080 | 1/1970 | Ehrensvärd et al. | 426/657 X |
| 3,887,717 | 6/1975 | Pfeiffer et al. | 426/437 X |
| 3,906,118 | 9/1975 | McFarland | 426/55 X |
| 3,962,481 | 6/1976 | Kumar | 426/657 X |
| 4,176,199 | 11/1979 | Vollmer et al. | 426/657 X |
| 4,186,216 | 1/1980 | Roth | 426/518 X |

*Primary Examiner*—Robert A. Yoncoskie
*Attorney, Agent, or Firm*—Toren, McGeady & Stanger

[57] ABSTRACT

The installation comprises substantially: a chopper for breaking up raw bones with meat still attached to them, an extraction tank containing an alcaline solution with a pH of the order of 10 to 12 for retaining the proteins, a precipitation tank for the proteins by supplying an acid solution bringing back the pH of the liquid phase to a value of the order of 6, and a separation device for the proteins using physical means such as centrifugation, filtration or decantation means.

9 Claims, 1 Drawing Figure

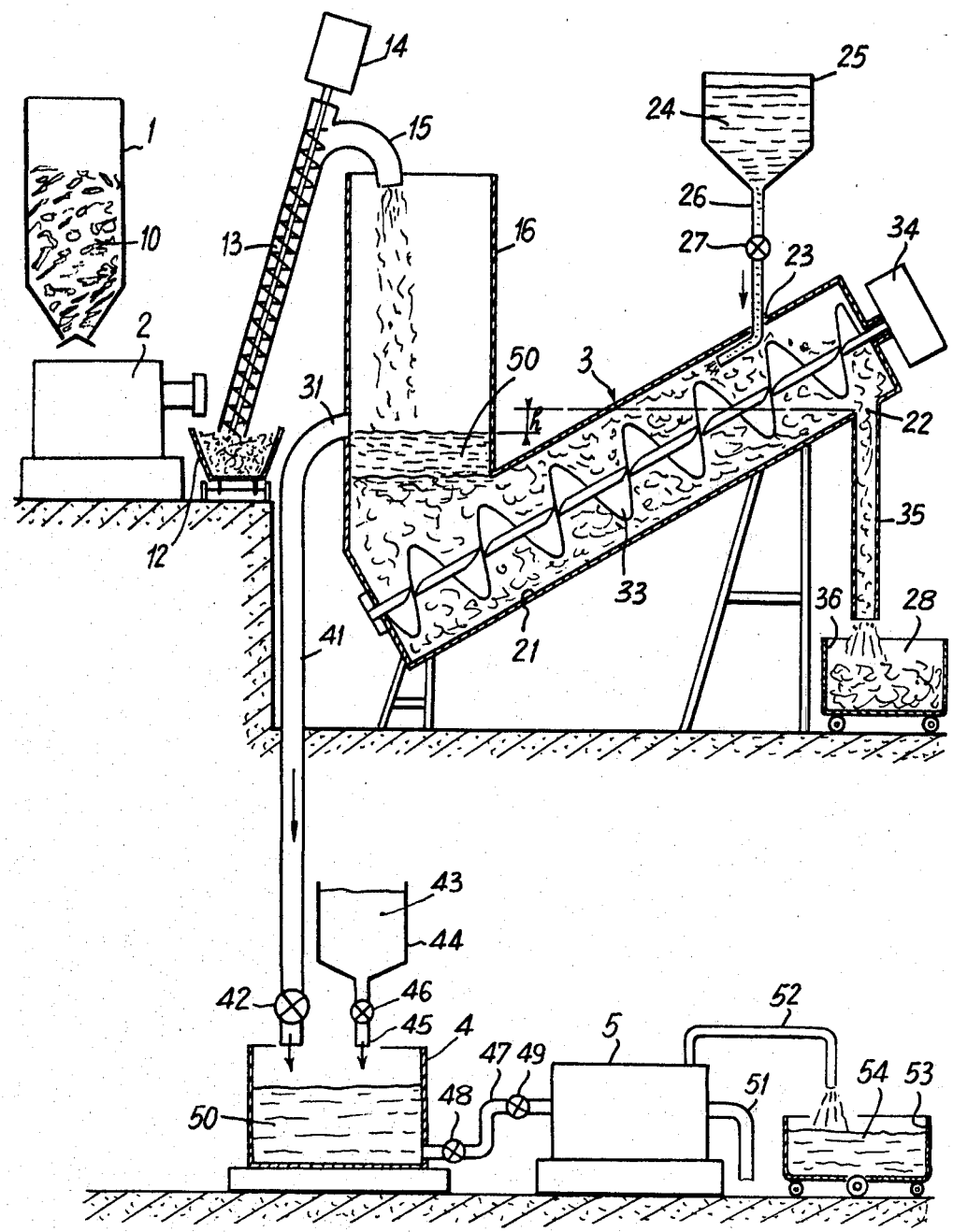

METHOD FOR RECOVERING MEAT PROTEINS REMAINING ATTACHED TO THE BONES AFTER THE BONING OPERATION

The invention relates to the recovery of the meat proteins which remain attached to the bones after the boning operation.

When boning meat, either manually or mechanically, it is not possible to avoid fragments of meat, of connective tissues, or fats, to remain attached to the bones in smaller or larger quantities. These various matters are however made of the same proteins as those forming meat, so that they would be usable for human feeding.

A number of methods aiming at such a recovery of the proteins is already known, but they all have recourse to physical actions for separating the meat and the bones, for instance by crushing, coarse and then fine breakage, pressure, etc. The result is that these methods do not provide a complete separation of the meat from the bones, since their principle does not allow avoiding a mixing of very fine fragments with the meat. This may be clearly shown by the analysis of the meat proteins obtained, revealing a calcium content higher than the average. On the other hand, during the treatments, it often happens that the product is heated and, consequently, that said meat proteins are degraded; of course, for limiting this heating, it is known to add ice to the bone and meat mixture to be crushed, but such a solution does not always give entire satisfaction since a portion of the proteins still remains degraded. Moreover, the marrow which is inside the bones is not recovered by these known physical processes. Finally, some installations are designed for the treatment of poultry bones, others the treatment of bovine bones, and still others for the treatment of porcine bones, but very seldom for the indifferent treatment of these three types of bones.

The object of the present invention is to provide a new method which does not exist the aforementioned disadvantages of the known methods which resort to treatments using only physical actions.

To this effect, the method according to the invention consists in: taking up the raw bones with the meat still attached thereto by a mechanical operation such as a crushing, a breaking up or a chopping operation; treating the calibrated product obtained in a highly alkaline solution with a pH of the order of 10 to 12, at room temperature, preferably counter-current, so as to cause the proteins to be recovered to pass in the liquid phase; precipitating said proteins by lowering the pH of the liquid phase to a value close to that of the meat, that is of the order of 4 to 8; and separating the proteins by physical means such as centrifugation, filtration or decantation.

With such a method, the totality of the proteins contained in the treated bone and meat mixture can be recovered, including those which are in the marrow inside the bones. It offers many advantages. As a matter of fact, an extremely carefull boning is no longer necessary since in any case all the proteins are finally recovered, thereby saving a precious time and even eventually avoiding using complex and costly machines; raw meat proteins can be obtained; there is no heating which could degrade the proteins; it allows treating indiscriminately bones of all origins, ovine, porcine, bovine; and finally, for working out the method, there are no costly investments to be made since the recovery process is carried out following a chemical route excluding accurate and complicated mechanisms.

A further object of the invention is an installation for working out the proposed method. Such an installation comprises: mechanical breaking up means for the raw bones with the meat attached thereto; an extraction tank disposed at the outlet of said breaking up means and containing a highly alcaline solution with a pH of the order of 10 to 12, said extraction tank having a discharge opening for the solution loaded with proteins and a discharge opening for the treated bones and cartilages; a precipitation tank for the proteins receiving the liquids phase loaded with proteins coming from the extraction tank and provided with acid input means suitable for lowering the liquid phase pH to a value of the order of 4 to 8; and a protein separation device using physical means such as centrifugation, filtration or decantation, connected to the outlet of the precipitation tank and formed with a discharge opening for the proteins and a discharge opening for the water.

The features and advantages of the invention will become more apparent from the following description, reference being made to the accompanying drawing, the single figure of which shows, by way of example, en embodiment of a protein recovery installation according to the invention.

The installation shown in the drawing for the recovery of the proteins from the meat attached to the bones, after the boning operation, comprises substantially: a storing silo 1 for the raw bones 10 to be treated and coming from a boning installation, mechanical breaking up means 2 for the bones 10 with the meat still attached thereto, in the present case a chopper, an extraction tank 3, a protein precipitation tank 4, and a protein separation device 5, in this case a centrifugal machine.

At the outlet of the chopper 2 is an intermediate tank 12 from which the material is taken up and carried upwards by an Archimedean screw elevator 13 driven by a motor 14 in order to be supplied through a spout 15 to the inlet or upstream end of the extraction tank 3 which is designed as a silo 16 for regulating the supply of material to said tank.

The bottom 21 of the extraction tank 3 is inclined towards the top and in the downstream direction where are formed a discharge opening 22 for the treated bones and cartilages 28 and an opening 23 for supplying the tank with a highly alkaline solution 24, for example sodium hydroxide, at a concentration between 1 and 10 g/l, and preferably 4 g/l, with a pH of the order of 10 to 12, contained in a tank 25 the outlet pipe 26 of which is provided with a flow regulation valve 27. The upstream portion of the extraction tank 3 is formed with an over-flow opening 31 through which flows out the protein loaded liquid phase, in a position at a level slightly lower, be a height "h", than the level of the downstream opening 22 provided for the discharge of the bones and cartilages, in such manner that the alkaline solution 24 flows, from the downstream to the upstream direction, counter-current to the flow direction of the solid matters 10 which are being treated and are slowly forwarded towards the upper portion of the tank by an Archimedean screw 33 driven by a motor 34. The treated bones and cartilages 28 which are discharged by the downstream opening 22 fall through a chute 35 into a tank 36 mounted on wheels.

The protein loaded liquid phase flows from the opening 31 of the extraction tank 3 through a chute 41 the lower end of which, provided with a valve 42, emerges above the protein precipitation tank 4 which is supplied with an acid solution, for example a hydrochloric acid solution 43, contained in the tank 44 placed above the tank 4 and the outlet piping 45 of which is provided with a flow regulation valve 46. The concentration of the acid solution 43 is such that it is capable of imparting to the liquid phase 50, within a rather short time, of the order of one minute, a pH of the order of 4 to 8, and preferably 6, thereby allowing to reach the isoelectrical point of the proteins.

The precipitation tank 4 is connected to the centrifugal machine 5 by a tubing 47 preferably provided with a stop-valve 48 and a pump 49. Finally, the centrifugal machine 5 is provided with water discharge pipe 51 and a spout 52 for discharging the proteins 54 in a tank 53 mounted on wheels.

The operation of the installation is the following: the raw bones 10 discharged from the silo 1 are cut by the chopper 2 into fragments of 50 mm maximum, and preferably of the order of 20 mm. They are taken up by the elevator 13 and discharged into the regulation silo 16 at the input of the extraction tank 3. In said tank, where the temperature is of the order of 5° to 25° C., and preferably 14° C., the bones moving up slowly along the inclined bottom 21 under the action of the archimedean screw 33, counter-current to the alcaline solution 24 which retains the proteins thereof for a duration of the treatment of the order of 6 to 24 hours, and preferably 8 hours; while the treated bones and cartilages 28 are discharged from the tank 3 by the downstream upper opening 22, the protein loaded liquid phase 50 flows through the lower over-flow opening 31 and the chute 41 into the precipitation tank 4 where it mixes up with the acid solution 43 which flows from the tank 44. Through the tubing 47, it reaches then the centrifugal machine 5 in which is effected to separation between the meat proteins and the water; the proteins 54 are forwarded through the spot 52 into the tank 53, while the waste water is discharged into the sewer via the pipe 51. The installation operates continuously and requires only few human interventions. The bacteriological proliferation is very reduced since the products are treated in the absence of air, which is favourable to a good preservation of the obtained proteins.

In an alternative installation, one may omit the silo 16 at the input of the extraction tank 3, if measures are taken so that the screw elevator 13 discharges the raw bones 10 directly and regularly in the extraction tank 3.

Instead of the extraction tank 3 using counter-current flows, one could use equivalent means such as for instance multiple tanks, or mechanical mixers.

One could also replace the centrifugal machine 5 by some other physical separation apparatus such as for instance a filtration or decantation device.

The meat proteins can be used directly in a production line, or stored, frozen for a subsequent use. As regards the bones and cartilages, when neutralized, they can advantageously be used, after being crushed, for feeding cattle in the shape of bone meal for instance.

What I claim is:

1. A method for recovering proteins from meat attached to bones comprising the steps of:
    (a) mechanically comminuting the bones into fragments,
    (b) contacting the bone fragments with an aqueous solution of an alkaline base having a pH of from about 10 to 12 at room temperature, until the meat attached to the bones is released,
    (c) keeping said fragments at room temperature in contact with the aqueous solution for a time sufficient to extract proteins,
    (d) separating the aqueous solution containing extracted protein from the bone fragments,
    (e) adjusting the pH of the separated aqueous solution down to between about 4 to 8 to precipitate the proteins from the solution, and
    (f) separating the precipitated proteins.

2. The method of claim 1 wherein the room temperature is kept within the limits of 5° to 25° C.

3. The method of claim 2 wherein the temperature is kept at about 14° C.

4. The method of claim 1 wherein the dimensions of the bone fragments do not exceed 50 mm.

5. The method of claim 4 wherein the fragments have dimensions of the order of 20 mm.

6. The method of claim 2 wherein the contacting time is from about 6 to 24 hours.

7. The method of claim 1 wherein the contacting is carried out by counter-current flow of the solution and the bone fragments.

8. The method of claim 6 wherein the contacting is carried out by counter-current flow of the solution and the bone fragments wherein the contact of the solution of alkaline base with the bone fragments is established by making flow the solution in counter-current to the running of the bone fragments.

9. A method of recovering proteins from meat attached to bones comprising the steps of:
    (a) mechanically comminuting the bones into fragments having dimensions of the order of 20 mm,
    (b) contacting the fragments to extract proteins by counter-current flow with an aqueous solution of 1 to 10 grams of sodium hydroxide per liter at a temperature of 5° to 20° C. for about 6 to 24 hours,
    (c) separating the aqueous solution containing extracted protein from the bone fragments and discarding the fragments,
    (d) admixing the separating aqueous solution with an acidic aqueous solution in an amount sufficient to bring the pH of the mixture obtained to a value of 4 to 8 to precipitate the proteins therein, and then
    (e) separating and recovering the proteins.

* * * * *